UNITED STATES PATENT OFFICE.

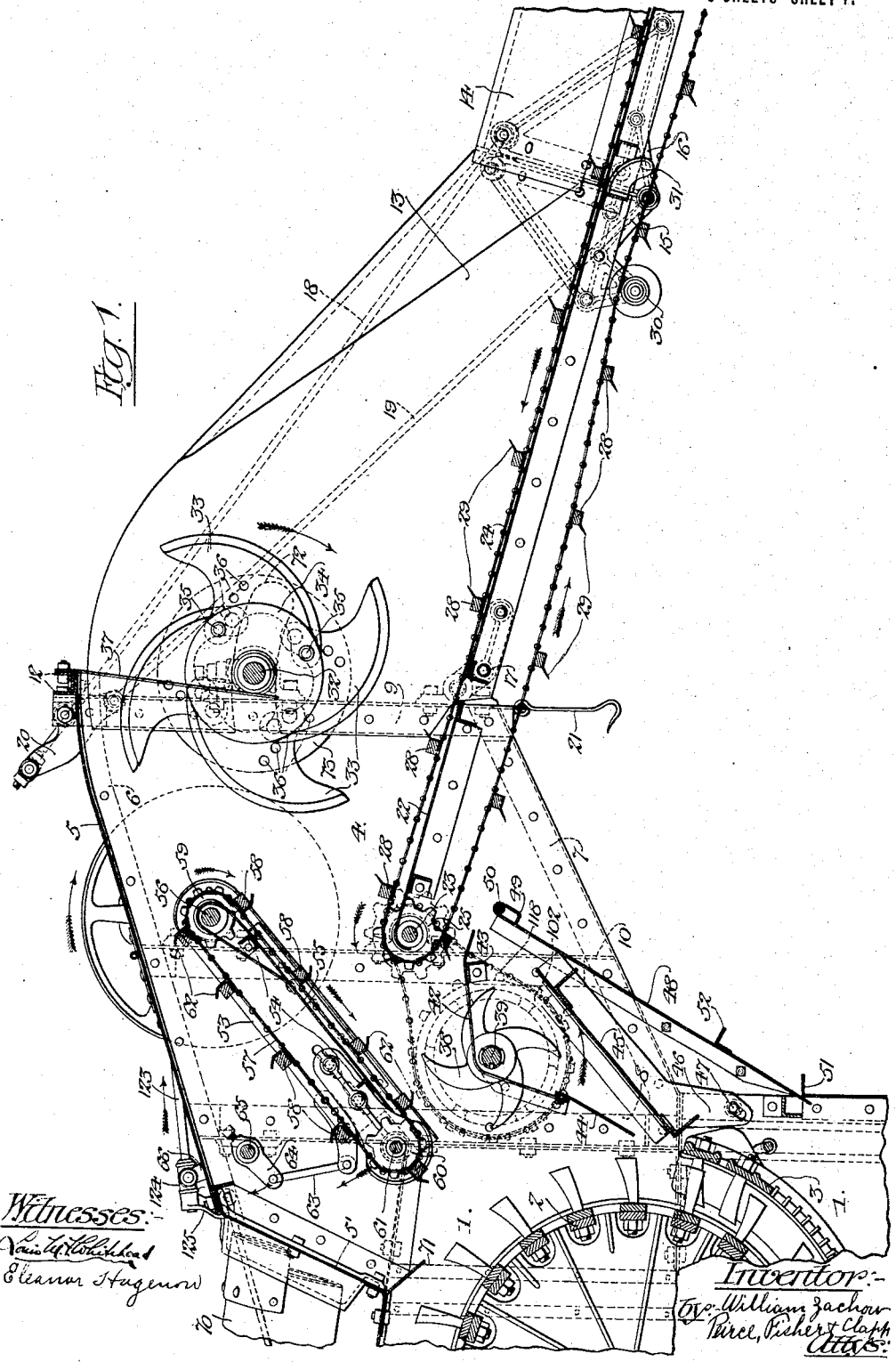

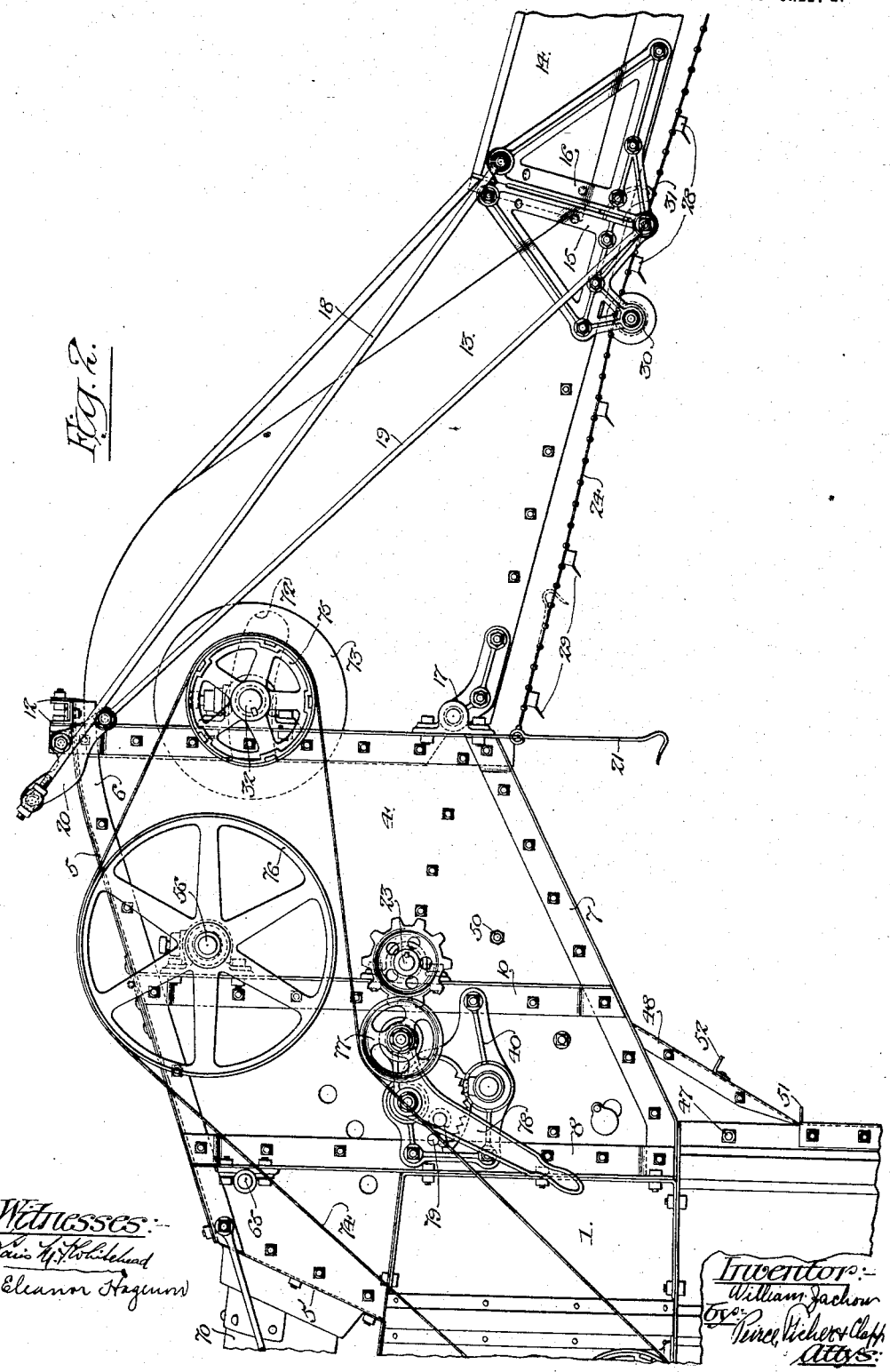

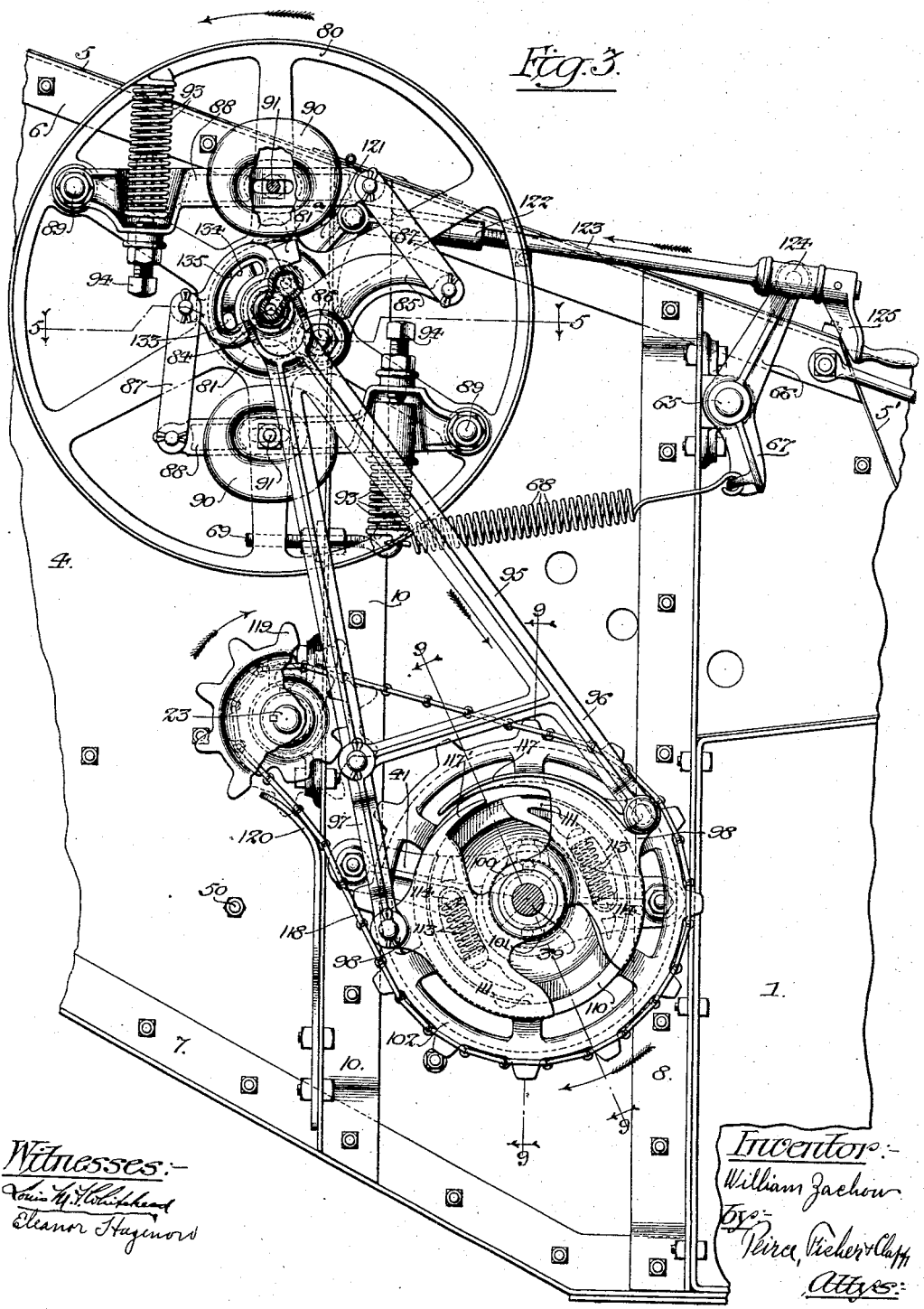

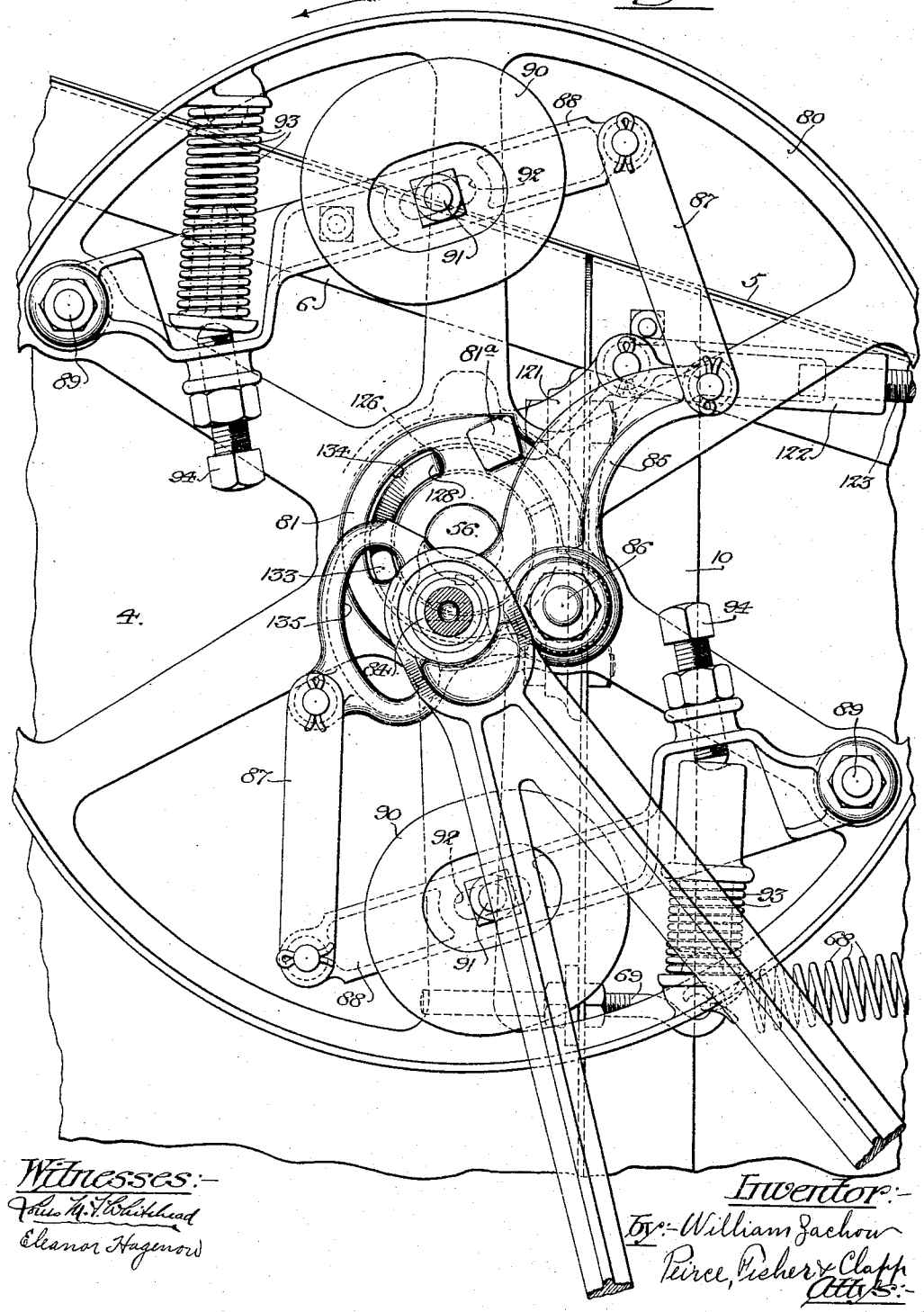

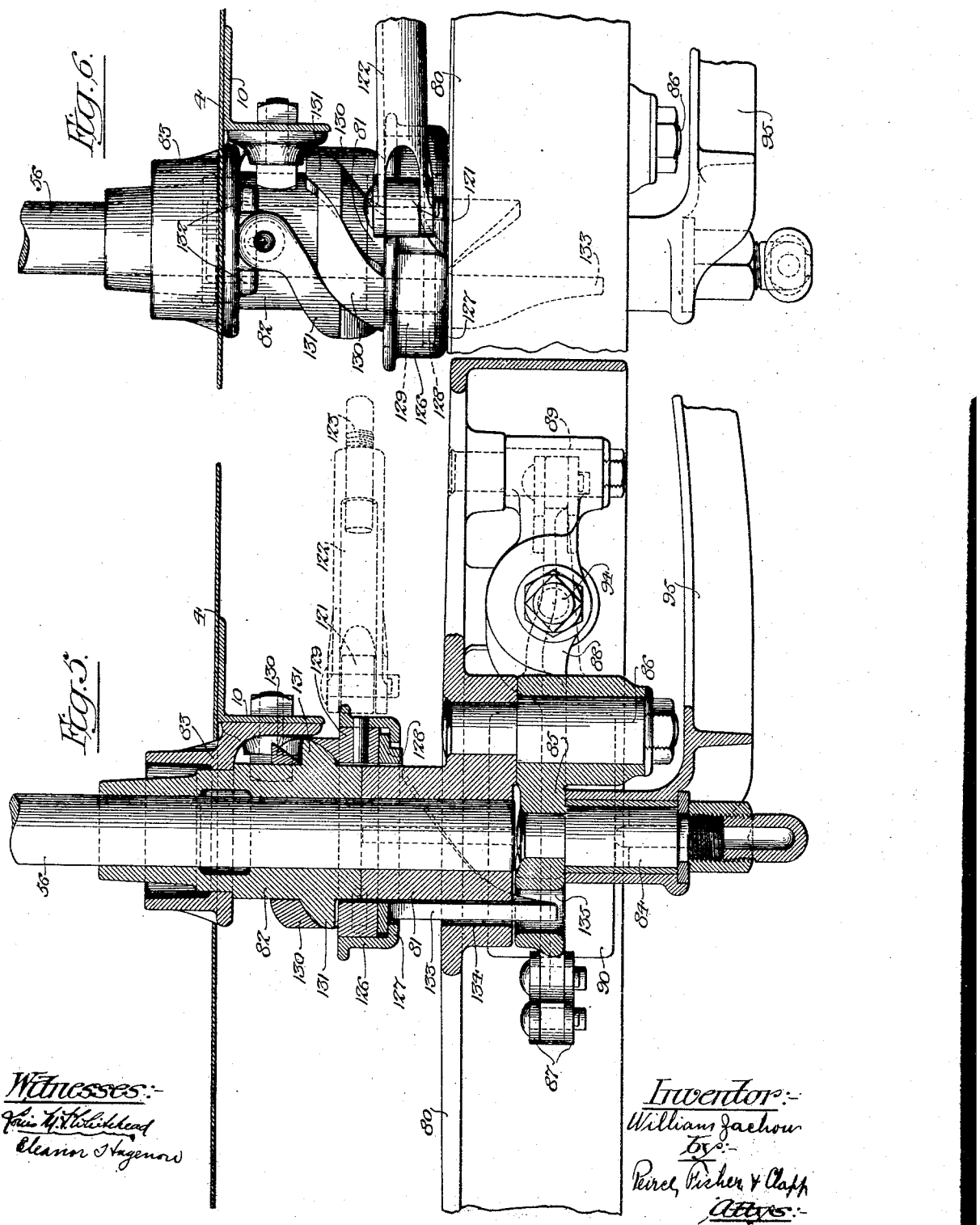

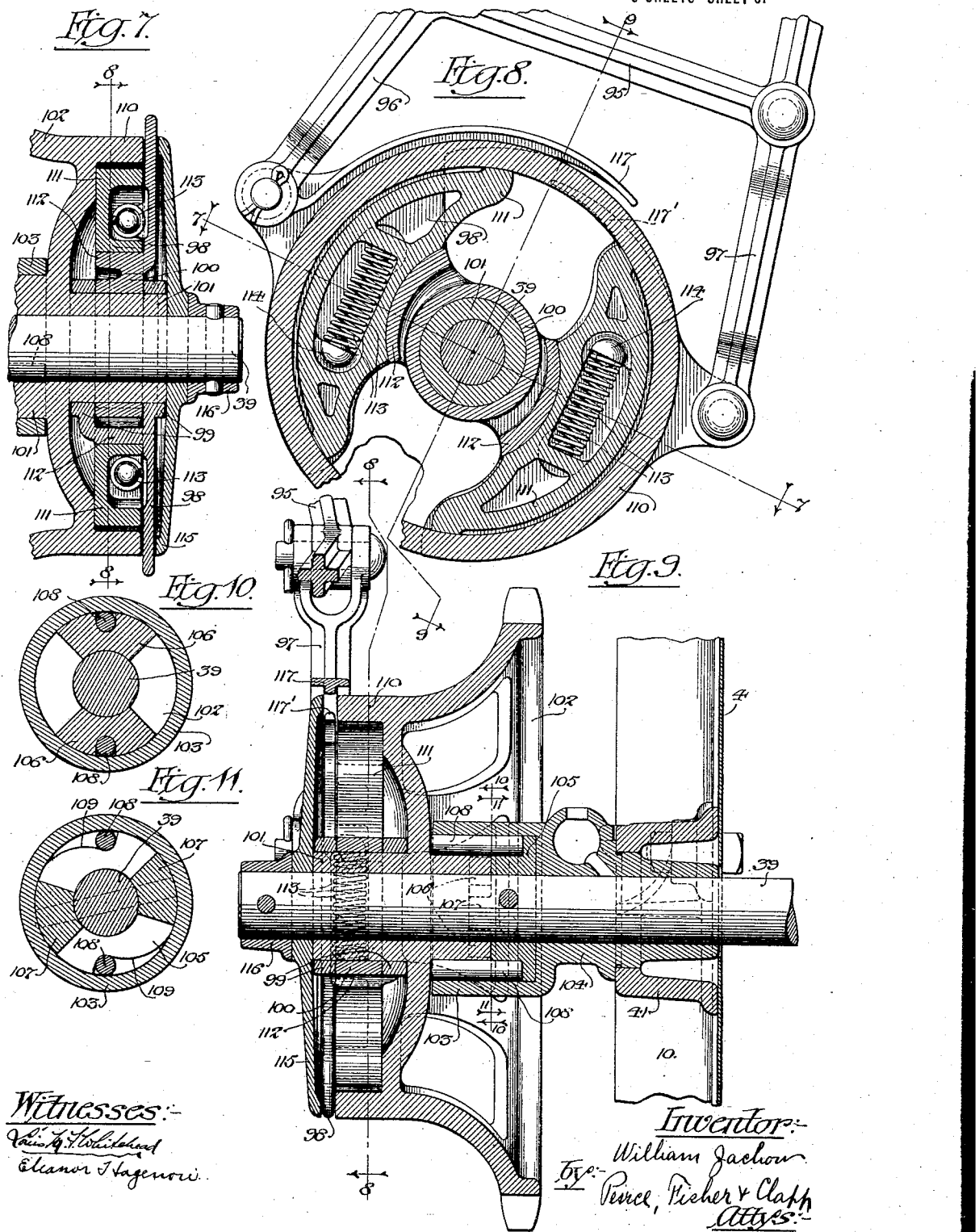

WILLIAM ZACHOW, OF RACINE, WISCONSIN, ASSIGNOR TO J. I. CASE THRESHING MACHINE COMPANY, OF RACINE, WISCONSIN, A CORPORATION.

BAND-CUTTER AND FEEDER.

1,186,262.     Specification of Letters Patent.     Patented June 6, 1916.

Application filed October 2, 1911. Serial No. 652,354.

*To all whom it may concern:*

Be it known that I, WILLIAM ZACHOW, a citizen of the United States, and a resident of Racine, county of Racine, and State of Wisconsin, have invented certain new and useful Improvements in Band-Cutters and Feeders, of which the following is a full, clear, and exact description.

The invention relates to band cutters and feeders for threshing machines and seeks to provide an improved construction by which the material is uniformly and evenly fed to the cylinder of the threshing machine. In pursuance of this object, the invention provides improved mechanism for gradually varying the speed of the feeding devices in accordance with the varying conditions.

The invention consists in the features of improvement hereinafter set forth, illustrated in the preferred form in the accompanying drawings and more particularly pointed out in the appended claims.

In the drawings, Figure 1 is a longitudinal section of the improved band cutter and feeder and of the forward end of the threshing machine to which it is attached. Fig. 2 is a view in elevation of the right-hand side of the same. Fig. 3 is a view in elevation of a portion of the left-hand side illustrating the driving mechanism for the feeding devices. Fig. 4 is a view in elevation on an enlarged scale of the mechanism for driving and varying the speed of the feeding devices and with the parts in the position assumed when the machine is in operation. Fig. 5 is a detail section on the line 5—5 of Fig. 3. Fig. 6 is a plan view of the parts shown in Fig. 5 and with certain of the parts shown in shifted position. Fig. 7 is an enlarged detail view of a portion of the drive mechanism for the feeding devices with parts shown in section on the line 7—7 of Fig. 8. Fig. 8 is a detail section on the line 8—8 of Figs. 7 and 9. Fig. 9 is a detail section on the line 9—9 of Figs. 3 and 8. Figs. 10 and 11 are detail sections on the lines 10—10 and 11—11 of Fig. 9 looking in opposite directions.

The improved band cutter and feeder is mounted in position upon the forward end of the threshing machine frame 1. The threshing machine is provided with the usual cylinder 2 and concave 3. The improved band cutter and feeder is formed of steel as shown and comprises a stationary casing having side walls 4 and an upper wall or deck 5 which are secured to suitable side frames formed of angle bars. In the construction shown, each side frame comprises upper and lower inclined bars 6 and 7 connected by inner and outer uprights 8 and 9 and an intermediate upright 10. Transverse angle bars 12 connect the upper portions of the side frames.

The main conveyer for the material or grain bundles is mounted in a frame which comprises inner and outer sections 13 and 14 which are connected at their adjacent ends by pairs of hinged brackets 15 and 16 fixed respectively to the opposite sides of the sections. The inner section 13 of the conveyer frame is pivotally connected to the outer lower portion of the stationary casing by hinge connections 17. Pairs of connecting rods 18 and 19 are connected respectively to the hinge brackets 16 on the outer frame section and to the hinge pintles between the brackets 15 and 16. At their inner ends the rods are connected to the opposite ends of a pair of rock arms 20 which are pivoted to the upper ends of the angle bars 9. These connections serve to sustain the carrier frame sections in extended position, as shown in Figs. 1 and 2, but permit the inward folding of the outer section. In the folded position, the outer section of the conveyer frame is upheld by hooks 21.

The sections of the conveyer frame are provided with bottom and side walls and the stationary casing is provided at its outer end with an inclined plate 22 which is in line with the bottom walls of the carrier frame when the latter is in extended position, as shown in Fig. 1. A cross shaft 23 is located at the inner end of the plate 22 and is journaled in suitable brackets on the uprights 10. Conveyer chains 24 extend over sprockets 25 on the shaft 23 and over similar sprockets on a shaft at the outer end of the conveyer frame. These chains are connected by cross-slats 28 having teeth 29 thereon which are rearwardly inclined upon the upper, operative portion of the conveyer. The lower portions of the conveyer chains 24 pass over flanged guide rollers 30 which are journaled upon depending portions of the hinge brackets 15. These hinge brackets are provided with forwardly projecting curved lugs 31 which engage the upper portions of the conveyer chains and hold them in place when the outer frame section is folded below the inner section.

The band cutting knives are preferably mounted upon a cross-shaft 32 which is journaled in suitable brackets on the forward uprights 9 of the main casing of the feeder. The knives 33 are provided with curved cutting edges and are secured to disks 34 upon the shaft 32 by pairs of bolts or studs 35. One of the bolts or studs of each pair is arranged to engage any one of a series of holes 36 formed in the knife, so that the knives may be adjusted to and from the bed formed by the inner end of the conveyer and above which the knives are located. A series of clearing blades 37 fixed to one of the cross-bars 12 extend downwardly between the knives, to prevent the winding of straw about the knife shaft.

The shaft 23 and the inner end of the main conveyer are located above and in front of the threshing cylinder 2. A rotary retarding device 38 is arranged in rear of the inner end of the conveyer and between the conveyer and the threshing cylinder. This retarding device comprises a series of curved teeth mounted upon a cross-shaft 39. This shaft is journaled at its ends in brackets 40 and 41 (see Figs. 2 and 3) which extend between and are fixed to the uprights 8 and 10. The teeth of the retarding device 38 operate upon the material through a slotted guard plate 42, the upper and lower portions of which are at an obtuse angle and which extends from a cross-bar 43 in front of the retarding device over the shaft 39 to a short, inclined feed plate 44 which is arranged above the forward edge of the concave 3. An inclined feed board 45 is arranged beneath the retarding device and is adapted to deliver the fine material passing therethrough to the concave 3 of the threshing cylinder. At its lower, inner end the feed board 45 is provided with depending lugs 46 which are slotted to engage pivot bolts 47 at the sides of the main frame. The upper end of the feed board 45 is sustained upon an inclined plate 48 which is provided at its upper end with elongated loops 49 engaging a cross-rod 50. The lower end of the plate 48 releasably engages a fixed transverse rib 51. The board 45 and plate 48 are normally stationary. They may be shifted, however, to afford access to the threshing cylinder and concave. The plate 48 has a combined longitudinal and pivotal movement upon the rod 50. By grasping the projecting angle bar 52 on the plate 48, the latter may be lifted and its lower end disengaged from the rib 51. The plate 48 and the feed board 45 may be then swung outwardly. It is thus unnecessary to release any bolts or catches in order to afford access to the threshing cylinder.

A downwardly and rearwardly inclined feeding conveyer is arranged above and adjacent the retarding device 38 and the rear end of the main conveyer. The frame of the supplemental feeding conveyer comprises side pieces 53 connected by angle bars 54 and a transverse bottom plate 55. At its upper end the frame is hung upon a shaft 56 that is journaled in suitable bearings upon the upper ends of the bars 10. Conveyer chains 57 are connected by cross-slats 58 and extend over sprockets 59 on the shaft 56 and over sprockets 60 on a shaft 61 that is journaled in the lower end of the conveyer frame. The lower portion of the feeding conveyer is in operative engagement with the material passing through the feeder and the slats 58 are preferably provided with teeth 62 which are inclined in a direction opposite to that in which the material is traveling.

The feeding conveyer has a swinging movement on the shaft 56. Its lower end is sustained in normal position by links 63 which are connected to rock arms 64 upon a cross-shaft 65. This shaft is journaled in bearings secured to the rear frame bars 8 of the feeder casing and at one end is provided with upwardly and downwardly projecting arms 66 and 67. The lower arm 67 is connected to one end of a spring 68, the opposite end of which is connected to an adjusting bolt 69 that extends through the flange of the adjacent angle bar 10. The supplemental conveyer is driven at a much higher speed than the main conveyer and the retarding device 38 and it engages the upper portion of the straw passing over the end of the conveyer, and the retarding device and advances it while the lower portion is held back by the teeth of the rotating retarder, so that the material is delivered in a thin sheet to the threshing cylinder. Excess material forced against the supplemental conveyer, swings it about the shaft 56 and against the pressure of the spring 68. When the excess material is removed, the spring 68 returns the parts to normal position. Suitable means are provided whereby the movement of the feeding conveyer controls the speed of the main conveyer and the retarding device, so that the feeding conveyer acts as a governor in maintaining the uniform supply of straw to the threshing cylinder. A pipe 70 opens through the rear, downwardly inclined portion 5' of the deck of the feeder, and through which the tailings are delivered, into the casing of the feeder and from thence into the front part of the threshing machine. A forwardly inclined deflector 71 is preferably arranged above the threshing cylinder and below the outlet of the pipe 70.

The side walls of the inner section 13 of the conveyer frame are provided with segmental slots or notches 72 through which the knife shaft 32 extends. By this arrangement the side walls of the conveyer section 13 can overlap the inner faces of the side walls of the stationary casing as shown and at the same time the inner section of the main frame may swing freely on the hinges 17 when the parts are shifted from the extended position shown in Fig. 1 to the folded position when not in use. A pair of sheet metal disks 73 are mounted upon the bearings of the shaft 32 and cover the slots 72 when the carrier frame is in extended position.

The knife shaft 32 and the shaft 56 are continuously driven by a belt 74 which passes over a pulley upon the shaft of the threshing cylinder 3 and over a pair of pulleys 75 and 76 fixed to the ends of the shafts 32 and 56, respectively. The pulleys 75 and 76 are preferably of such size that the knife shaft is driven at approximately twice the speed of the conveyer shaft 56. The belt 74 passes over a tightening pulley 77 which is journaled upon an arm or lever 78. This pulley is pivotally mounted upon the bracket 40 and is provided with a dog 79 arranged to engage a notched segment on the bracket.

The shaft 56 operates the supplemental feeding conveyer mounted thereon and it is also the drive shaft for the main conveyer and the retarding devices 38. This shaft operates the retarding device and the main conveyer through the medium of an adjustable crank pin and a reciprocating driving element and means are provided for varying the throw of the crank pin and driving element in accordance with the speed of the threshing cylinder and also in accordance with the variations and the pressure of straw or other material against the supplemental swinging conveyer.

On the side of the machine opposite the pulley 76 the main drive shaft 56 of the feeder is provided with a pulley 80, the hub 81 of which is keyed to the shaft (see Figs. 4 and 5). This hub (see Figs. 5 and 6) abuts against the adjacent bearing 82 for the shaft and the latter is mounted in a bracket 83 which is fixed to the adjacent angle bar 10. An operating crank pin 84 (see Figs. 4 and 5) is carried upon a supporting arm 85 and the latter is pivoted or journaled intermediate its ends upon a bolt or stud 86 that is fixed in eccentric or off-set position upon the hub 81 of the pulley 80. Links 87 connect the ends of the supporting arm 85 to the free ends of a pair of governor arms 88, the opposite ends of which are pivotally connected to the pulley 80, adjacent the rim thereof, by the bolts 89. Weights 90 are adjustably mounted on the arms by bolts 91 extending through slots 92 therein. Springs 93 extend between lugs on the pulley and adjusting screws 94 on the arms. In the idle position of the parts, shown in Fig. 3, the weighted governor arms 88 are held in the innermost position by the springs 93 and the supporting arm 85 whereon the crank pin 84 is mounted, is held against a projecting stop lug 81ª on the hub of the pulley. In this position of the parts, the crank pin 84 is in line with the axis of the shaft 56 (see Figs. 3 and 5) so no motion is imparted to the reciprocating driving element operated by the crank pin. As the cylinder of the machine approaches threshing speed, the governor arms are moved outwardly against the pressure of the springs 93 by centrifugal force and the arm 85 is shifted to thereby move the crank pin 84 to its eccentric, operative position shown in Fig. 4. The springs 93 are so arranged that the leverage exerted thereby on the arms 88 is considerably reduced as the latter move outwardly. By this arrangement, the springs stoutly resist the movement of the supporting arm 85 and the crank pin 84 until the cylinder of the machine reaches its threshing speed and then, as the governor arms move outwardly, the leverage of the springs 93 thereon is reduced and the governor arms act to quickly shift the arm 85 and the crank pin 84 thereon to its operative position.

The reciprocating driving element comprises a triangular member 95, the narrow upper end of which is journaled upon the crank pin 84. The lower wide end of the reciprocating driving element is provided with an integral extension 96 on one side and at its opposite side with a pivoted link 97. The extension 96 and the link 97 are pivotally connected to lugs on the outer ends of a pair of segmental arms 98 which are loosely mounted upon the end of the shaft 39 of the rotary retarding device. In the form shown, one of the arms 98 is provided with a bifurcated hub 99 (see Fig. 7) and straddles the hub 100 of the other arm, both of these hubs being mounted upon the hub 101 of a sprocket wheel 102 which is loosely mounted on the end of the shaft 39. The inner end of the hub 101 extends within the sleeve-like outer end portion 103 of the adjacent bearing 104 for the shaft 39. This bearing is mounted on the bracket 41. A collar 105 is arranged within the sleeve 103 and this sleeve is pinned to the shaft 39. The collar 105 and the hub 101 of the sprocket 102 are provided with interlocking lugs 106 and 107 (see Figs. 9, 10 and 11) through the medium of which the shaft 39 is driven with the hub 101. A pair of rollers 108 are arranged in notches in the periphery of the hub 101 and extend within cam grooves 109 in the periphery of the collar 105. The forward movement of the hub 101 normally holds the rollers 108 in the wide portions of the slots 109, but any tendency of the shaft 39 and the parts mounted thereon to move in backward direction forces the rollers 108 toward the narrow ends of the cam grooves 109 so that the rollers bind on the stationary sleeve 103.

The hub 109, sprocket 102 and shaft 39 are operated by the reciprocating driving element 95 by what may be termed a friction pawl and ratchet mechanism. For this purpose, the sprocket 102 is provided with a projecting flange 110 having an internal friction surface arranged to be engaged by a pair of segmental friction shoes 111. These shoes are arranged between the web-like body portion of the sprocket 102 and the segmental arms 98. The inner edges of the shoes bear against a pair of lugs 112 on the arms. The lugs and the inner edges of the shoes are provided with eccentrically disposed, segmental cam surfaces, as most clearly shown in Fig. 8. Springs 113 extend between projecting lugs 114 on the arms 98 and the shoes 111 and tend to force the latter longitudinally into engagement with the cam lugs 102. The arms and shoes are oppositely acting. That is to say, when the reciprocating driving element 95 shifts in one direction, the cam lug 112 of one of the arms 98 forces the corresponding shoe 111 into engagement with the friction surface of the flange 110, while the cam lug 112 of the other arm tends to move away from its shoe so that the grip of the latter upon the flange 110 is relieved. When the driving element 95 is shifted in the opposite direction, the action of the two arms is reversed. In this way the arms act alternately and serve to continuously rotate the sprocket wheel 102 and shaft 39 in the direction indicated by the arrows in Figs. 3 and 8. In the dead center position of the crank pin 84, the grip of both shoes is relieved, but the parts operated thereby are held against backward movement by the braking action of the rollers 108 on the sleeve 103, as previously described. A covering disk 115 is held in position over the arms and shoes of this driving mechanism by a collar 116 that is pinned to the end of the shaft 39. Extensions 117 and 117′ on the arms 98 extend over the slot between the disk 115 and the flange 110 to prevent the entrance of dirt and chaff into this drive mechanism.

It should be understood that other means may be provided by which the reciprocating driving element 95 may operate the shaft 39 and sprocket 102. This sprocket is connected by a chain 118 to a sprocket 119 on the shaft 23 of the main conveyer. This chain passes over a tightener bar or guide 120 which is fixed to the flange of the adjacent upright bar 10.

As stated, suitable means are provided for varying the throw of the crank pin 84 and of the reciprocating driving element 95 in accordance with the movement of the swinging supplemental carrier or straw governor. In the preferred construction shown, the shaft 65 which is connected to the swinging carrier frame or straw governor, is provided at its outer end, as stated, with an upwardly projecting arm 66. This arm is connected to a rock arm 121 that is loosely mounted on the hub 81 of the pulley 80. The connecting link between the arms 66 and 121 preferably comprises a sleeve 122 and a rod 123, the end of which is threaded into the sleeve 122. The outer end of the rod 123 is journaled in a sleeve 124 which is pivoted on the end of the arm 66. Beyond the sleeve 124 the rod 123 is provided with a hand crank 125.

The arm 121 is provided with an enlarged circular hub 126 having an inturned lip or flange 127 on one side. A ring 128 is loosely fitted within the hub 126 and upon the hub 81 of the pulley 80. This ring is held in place against the lip 127 by a ring 129 arranged within the hub 126 and pinned thereto, as shown. By this arrangement, the ring 128 is free to rotate independently of the rock arm 121 and the hub 126 thereof, but is compelled to shift longitudinally with the rock arm upon the hub 81. The ring 129 is provided with a series of spiral cam lugs 130 which coöperate with a corresponding series of cam lugs 131 on the fixed bearing sleeve 82. One of the spiral cam lugs or ribs 131 of this sleeve extends between a pair of lugs 132 on the adjacent bracket 83, so that the sleeve 82 is rigidly held against movement. The ring 128 is provided with a projecting cam finger 133 which extends through a slot 134 in the hub 81 of the pulley 80 and also through a slot 135 in the supporting arm 85 which carries the crank pin 84.

When the threshing cylinder and feeder are driven at high speed, and the proper amount of straw is fed to the cylinder, the parts of the driving mechanism are in the position shown in Fig. 4. Under such circumstances, the shifter or cam finger 133 abuts against one end of the slot 135 in the arm 85 and against the opposite end of the slot 134 in the hub 81, and the shifter or cam finger is free to rotate with the hub 81 and parts carried thereby, since the ring 128 whereon the cam finger is mounted is free to rotate within the hub 126 of the rock arm 121. If an excessive amount of material, or if the straw is wet and packs against the supplemental feeding conveyer or straw governor to swing the same rearwardly, the rock arm 121 is thereby shifted and by the action of the cam lugs 131 and 132, the arm is moved outwardly, as shown in Fig. 6. The rotating cam finger 133 is then forced outwardly between the opposite ends of the slots 134 and 135 and thus shifts the arm 85 on the pulley 80. This shift of the arm 85 tends to move the crank pin back toward the axis of the shaft 56 and thereby reduces the throw of the crank pin and of the driving element 95. The speed of the retarding device 38 and of the main conveyer is then reduced until the pressure of the material upon the supplemental feeding conveyer or straw governor is relieved. The spring 68 of the straw governor and the springs 93 of the speed governor then return the parts to their usual working position.

By the means described, the speed of the retarding device and main conveyer is automatically controlled to supply an even uniform feed of straw to the threshing cylinder in spite of the varying condition of the straw. Furthermore, it should be noted that the speed is gradually varied by gradually varying the throw of the operating crank pin and of the reciprocating driving element operated thereby, so that the feeder will accommodate itself to widely varying conditions. The speed of the retarding device and main conveyer can also be regulated very conveniently by hand through the medium of the crank 125. By rotating this crank, the rock arm 121 and shifting finger 133 can be actuated during the operation of the machine to adjust the crank pin 84 and thereby change the speed of the feeding devices.

It is obvious that changes may be made in the details set forth without departing from the essentials of the invention as defined in the claims.

I claim as my invention:—

1. In feeders for threshing machines, the combination with the threshing cylinder, of a main conveyer, a retarder between the inner end of said conveyer and said cylinder, a feeding conveyer downwardly and rearwardly inclined over the inner end of said main conveyer and over said retarder, a swinging frame for said feeding conveyer pivotally mounted at its upper forward end, a drive shaft connected to said feeding conveyer, variable speed mechanism connecting said drive shaft to said main conveyer and said retarder, and means connected to the frame of said feeding conveyer for controlling said variable speed mechanism to thereby gradually change the speed of said main conveyer and said retarder.

2. In feeders for threshing machines, the combination with the threshing cylinder, of a main conveyer, a retarder between the inner end of said conveyer and said cylinder, a feeding conveyer downwardly and rearwardly inclined over said retarder, a swinging frame for said feeding conveyer, a reciprocating driving element for said conveyer and said retarder, and means operatively connected to said swinging conveyer frame for varying the throw of said reciprocating driving element to vary the speed of movement of said main conveyer and said retarder.

3. In feeders for threshing machines, the combination with the threshing cylinder, of a main conveyer, a retarder between the inner end of said conveyer and said cylinder, a feeding conveyer downwardly and rearwardly inclined over said retarder, a swinging frame for said feeding conveyer, a main drive shaft for said conveyers and said retarders, a crank pin on said shaft, driving connections extending from said crank pin to said retarder and said main conveyer, and means connected to said swinging conveyer frame for shifting said crank pin and thereby vary the speed of said main conveyer and retarder.

4. In feeders for threshing machines, the combination with the threshing cylinder, of a main conveyer, a rotary retarder between the inner end of said conveyer and said cylinder, a feeding conveyer downwardly and rearwardly inclined over said retarder, a swinging frame for said feeding conveyer, a main drive shaft for said conveyers and retarder and whereon said feeding conveyer frame is hung, a crank pin on said shaft shiftable to and from the axis thereof, driving connections extending from said crank pin to said retarder and said main conveyer, a centrifugal governor on said shaft for shifting said crank pin to and from operative position, and a shifter for said pin operatively connected to said swinging conveyer frame.

5. In feeders for threshing machines, the combination with a conveyer and band cutting knives, of a feeding conveyer in rear of said knives and above the inner end of said main conveyer, a swinging frame for said feeding conveyer, a reciprocating driving element for said main conveyer, and a shifter operatively connected to said swinging conveyer frame for varying the throw of said reciprocating driving element to thereby vary the speed of said main conveyer.

6. In feeders for threshing machines, the combination with the frame and a conveyer, of a main drive shaft, connections between said shaft and said conveyer including a reciprocating driving element, and means adapted to be operated by the pressure of material for varying the throw of said reciprocating driving element to thereby vary the speed of movement of said conveyer, substantially as described.

7. In feeders for threshing machines, the combination with the frame and a conveyer, of a main drive shaft, a crank pin on said shaft shiftable to and from the axis thereof, driving connections between said crank pin and said conveyer, a member arranged to be shifted by the pressure of the material, and means for shifting said pin operatively connected to said member.

8. In feeders for threshing machines, the combination with the frame and a conveyer, of a main drive shaft, a crank pin on said shaft shiftable to and from the axis thereof, driving connections between said crank pin and said conveyer, a member arranged to be shifted by the pressure of material, a centrifugal governor for shifting said pin away from the axis of said shaft, and means for shifting said pin in the opposite direction operatively connected to said member.

9. In feeders for threshing machines, the combination with the frame and a conveyer, of a main drive shaft, a crank pin on said shaft shiftable to and from the axis thereof, driving connections between said crank pin and said conveyer, a member arranged to be shifted by the pressure of material and a centrifugal governor mounted on said shaft and connected to said pin for shifting the same to operative position.

10. In feeders for threshing machines, the combination with the threshing cylinder, of a conveyer, a retarder between said conveyer and said cylinder, a main drive shaft, variable speed mechanism connecting said drive shaft to said retarder and said conveyer, a centrifugal governor mounted on said drive shaft and connected to said variable speed mechanism for throwing the same into and out of operation, and controlling means operated by the pressure of material and connected to and acting on said variable speed mechanism in opposition to said governor to thereby vary the speed of movement of said conveyer and said retarder and to stop the same upon excessive choking of the material.

11. In feeders for threshing machines, the combination with the threshing cylinder, of a conveyer, a main drive shaft, variable-speed drive mechanism connecting said shaft to said conveyer and having a member shiftable to throw said conveyer into and out of operation and to vary the speed thereof, a centrifugal governor connected to and acting on said shiftable member for throwing said drive mechanism into and out of operation, and means controlled by the pressure of the material connected to and acting on said shiftable member in opposition to said centrifugal governor to thereby vary the speed of said conveyer and arrest the same upon excessive choking.

12. In feeders for threshing machines, the combination with the frame, band cutters and a conveyer for feeding the material, of a main drive shaft for said conveyer, a shiftable crank pin on said shaft held, in idle position, in line with the axis thereof, a reciprocating driving element engaging said pin and operatively connected to said conveyer, and means for automatically shifting said pin to and from operative position.

13. In feeders for threshing machines, the combination with the frame, band cutters and a conveyer for feeding the material, of a main drive shaft for said conveyer, a reciprocating driving element to vary the speed of movement of said conveyer operated by said shaft, a centrifugal governor on said shaft for throwing said driving element into operation, a shifter acting in opposition to said governor for varying the throw of said driving element, and means arranged to be operated by the pressure of material for actuating said shifter, substantially as described.

14. In feeders for threshing machines, the combination with the frame, band cutters and a conveyer for feeding the material, of a main drive shaft for said conveyer, a reciprocating driving element for said conveyer operated by said shaft, a centrifugal governor on said shaft for throwing said driving element into operation, a shifter acting in opposition to said governor for varying the throw of said driving element, a swinging member arranged to be operated by the pressure of material, and actuating connections between said member and said shifter, substantially as described.

15. In feeders for threshing machines, the combination with the frame, band cutters and a conveyer for feeding the material, of a main drive shaft for said conveyer, a shiftable crank pin on said shaft, driving connections between said crank pin and said conveyer, a rock arm loosely mounted on said shaft, a shifter for said crank pin operated by said rock arm, and a member connected to said rock arm and arranged to be operated by the pressure of material passing through the feeder.

16. In feeders for threshing machines, the combination with the frame, band cutters and a conveyer for feeding the material, of a main drive shaft for said conveyer, a shiftable crank pin on said shaft, driving connections between said crank pin and said conveyer, a centrifugal governor on said shaft for throwing said pin into and out of operative position, a shifter for said crank pin mounted on said shaft and acting in opposition to said governor, and a member operatively connected to said shifter and arranged to be moved by the pressure of material passing through the feeder.

17. In feeders for threshing machines, the combination with the frame, band cutters and a conveyer for feeding the material, of a main drive shaft for said conveyer, a shiftable crank pin on said shaft, driving connections between said crank pin and said conveyer, a shifter for said crank pin, a member arranged to be operated by the pressure of material, connections between said member and said shifter, and a handle for manually adjusting said connections.

18. In feeders for threshing machines, the combination with a fixed casing, of a knife shaft journaled upon the forward end of said fixed casing, a conveyer frame pivoted to said casing below said shaft and having side plates overlapping the side plates of said fixed casing and provided with segmental slots therein through which said shaft extends, and plates on said shaft for covering said slots when said conveyer frame is extended, substantially as described.

19. In feeders for threshing machines, the combination with the threshing cylinder and concave, of a conveyer and a retarder between said conveyer and said cylinder, of an inclined feed board below said retarder and pivotally mounted at its lower end adjacent said concave, an inclined plate for holding said feed board in position, a pivot bolt supporting the upper end of said plate, said plate having a combined pivotal and longitudinal movement on said bolt, and a fixed part for releasably supporting the lower free end of said plate, substantially as described.

WILLIAM ZACHOW.

Witnesses:
JOHN J. KENNEY,
A. J. WEISSERT.

Copies of this patent may be obtained for five cents each, by addressing the "Commissioner of Patents, Washington, D. C."